United States Patent
Nelson et al.

(10) Patent No.: US 7,300,236 B2
(45) Date of Patent: Nov. 27, 2007

(54) BULKHEAD LIFT APPARATUS

(75) Inventors: Roger Nelson, Rice Lake, WI (US); Chad Nelson, Rice Lake, WI (US)

(73) Assignee: FG Products, Inc., WI (US)

( * ) Notice: Subject to any disclaimer, the term of this patent is extended or adjusted under 35 U.S.C. 154(b) by 210 days.

(21) Appl. No.: 11/033,642

(22) Filed: Jan. 12, 2005

(65) Prior Publication Data

US 2005/0207860 A1    Sep. 22, 2005

Related U.S. Application Data (60) Division of application No. 10/427,742, filed on May 1, 2003, now Pat. No. 6,857,834, which is a continuation-in-part of application No. 09/909,484, filed on Jul. 20, 2001, now Pat. No. 6,626,625.

(60) Provisional application No. 60/219,534, filed on Jul. 20, 2000.

(51) Int. Cl.
*B60P 7/08* (2006.01)

(52) U.S. Cl. ....................... 410/130; 410/135

(58) Field of Classification Search ................ 410/130, 410/135–136, 140; 254/391, 398; 296/24.35, 296/24.41; 24/136 R, 136 K, 136 L, 136 A, 24/115 M, 171, 194, 536, 134 KB See application file for complete search history.

(56) References Cited

U.S. PATENT DOCUMENTS

| | | | |
|---|---|---|---|
| 1,061,974 A | 5/1913 | Bohn | |
| 1,193,255 A | 8/1916 | Gibbs | |
| 1,896,198 A | 2/1933 | MacMillan | |
| 1,970,610 A | 8/1934 | McMullen et al. | |
| 2,238,700 A | 4/1941 | Lundvall | |
| 2,238,988 A | 4/1941 | Ashworth | |
| 2,324,721 A | 7/1943 | O'Connor | |
| 2,346,853 A | 4/1944 | Lundvall | |
| 2,752,864 A | 7/1956 | McDougal, Sr. et al. | |
| 2,866,419 A | 12/1958 | Candlin, Jr. | |
| 2,895,431 A | 7/1959 | Ford | |

(Continued)

OTHER PUBLICATIONS

Trade Literature describing Randall Bulkhead Systems believed to have been offered for sale prior to May 1, 2003.

(Continued)

*Primary Examiner*—Stephen Gordon
(74) *Attorney, Agent, or Firm*—Fish & Richardson P.C.

(57) ABSTRACT

An apparatus for lifting or moving a partition or panel may in one embodiment include a frame that is mountable to an interior surface of a cargo area and a locking mechanism comprised of smooth and knurled guide and locking pins through which a strap is fed. In preferred embodiments at least one knurled locking pin can slide between a locking position which inhibits strap movement and a non-locking position in which the strap is substantially free to slide through the lift mechanism. In certain embodiments a knurled locking pin may be operable to slide into a locking position when a load is placed on a lifting end of the strap, such as when the strap is connected to a panel which is being lifted or moved. The knurled locking pin may also be operable to slide to a non-locking position when a user pulls on the opposite end of the strap.

27 Claims, 9 Drawing Sheets

U.S. PATENT DOCUMENTS

| | | | |
|---|---|---|---|
| 3,017,843 | A | 1/1962 | Loomis et al. |
| 3,057,284 | A | 10/1962 | Learmont |
| 3,070,044 | A | 12/1962 | Tobin |
| 3,162,146 | A | 12/1964 | Knippel et al. |
| 3,217,664 | A | 11/1965 | Aquino et al. |
| 3,413,932 | A | 12/1968 | Bennett |
| 3,438,149 | A | 4/1969 | Ilg |
| 3,680,492 | A | 8/1972 | Weage |
| 4,019,442 | A | 4/1977 | Lee et al. |
| 4,049,311 | A | 9/1977 | Dietrich et al. |
| 4,265,577 | A | 5/1981 | Loomis |
| 4,352,386 | A * | 10/1982 | Butler et al. |
| 4,639,031 | A | 1/1987 | Truckenbrodt |
| 4,780,034 | A | 10/1988 | Skotte |
| 4,880,342 | A | 11/1989 | Pradovic |
| 4,886,404 | A | 12/1989 | Jensen et al. |
| 5,010,943 | A | 4/1991 | Boyer |
| 5,161,848 | A | 11/1992 | Lutton |
| 5,664,386 | A | 9/1997 | Palmersten |
| 5,704,676 | A | 1/1998 | Hill |
| 5,984,601 | A | 11/1999 | Jevaney et al. |
| 6,017,175 | A | 1/2000 | Kassab et al. |
| 6,053,679 | A | 4/2000 | Duffell |
| 6,514,022 | B2 | 2/2003 | Truckor et al. |
| 6,626,625 | B2 | 9/2003 | Nelson et al. |
| 6,857,834 | B2 * | 2/2005 | Nelson et al. ............... 410/130 |

OTHER PUBLICATIONS

Trade Literature describing Tempar Bulkhead Systems believed to have been offered for sale prior to May 1, 2003.
Trade Literature describing ROM Bulkhead Systems believed to have been offered for sale prior to May 1, 2003.
Trade Literature describing Bulkhead Seals believed to have been offered for sale prior to May 1, 2003.
Trade Literature describing Donovan Bulkhead Systems believed to have been offered for sale prior to May 1, 2003.
Trade Literature describing FG Products Bulkhead Systems believed to have been offered for sale prior to May 1, 2003.
Trade Literature describing ISOWALL Insulation Partition Walls believed to have been offered for sale prior to May 1, 2003.
Trade Literature describing LOAD-LOK Cargo Restraint Systems believed to have been offered for sale prior to May 1, 2003.
Trade Literature describing Schmitz Cargobull Bulkhead Systems believed to have been offered for sale prior to May 1, 2003.

* cited by examiner

BULKHEAD LIFT APPARATUS

CROSS-REFERENCE TO RELATED APPLICATIONS

This application is a divisional of patent application Ser. No. 10/427,742, filed on May 1, 2003, now issued as U.S. Pat. No. 6,857,834, which is a continuation-in-part of patent application Ser. No. 09/909,484, now U.S. Pat. No. 6,626,625, filed on Jul. 20, 2001, which claims the benefit of provisional patent application Ser. No. 60/219,534, filed on Jul. 20, 2000, the complete disclosures of which are incorporated herein by reference.

TECHNICAL FIELD

Movable partitions, panels, and bulkheads can be used to separate or insulate cargo during transportation or storage. Cargo areas can be separated into a plurality of areas that are maintained at different temperatures, an application commonly known as multi-temperature transport. Particularly in such applications, it is useful to provide apparatus for lifting and moving the partitions to permit ingress, egress, and storage of the partitions.

BACKGROUND

Perishable items such as produce and meat are often transported in refrigerated trailers, railcars, or ocean-going containers that can be transported on ships, trains or trucks. Such cargo transport devices are typically equipped with a refrigeration unit which conditions the air inside the cargo space, thereby maintaining desired temperatures and humidities during transportation or storage. Refrigerated trailers, railcars and containers are typically configured so as to enclose a single, large cargo space. Their refrigeration units will accordingly maintain the entire cargo space at the same temperature and humidity unless the cargo area is somehow divided. However, when the perishable cargo does not fill the entire trailer, cooling the entire cargo area is unnecessary and costly. It causes unnecessary strain and wear on the refrigeration unit, increases fuel consumption, raises transportation costs, and lengthens the time necessary to cool the perishable cargo after any temperature aberration.

Movable partitions and bulkheads having a specialized construction which permits the cargo space of trailers, rail cars, and containers to be readily divided into sections of varying sizes are known. Such bulkheads and partitions have been widely used to separate cargo areas for multi-temperature transport. The structure and configuration of partition and bulkhead systems differ somewhat depending on whether they are being deployed in a trailer, railcar, or container. Partitions currently used in refrigerated truck trailers typically extend from floor to ceiling and are generally comprised of modular wall sections. The modular sections are often mounted in channels or grooves on the trailer floor, held in place by friction, or otherwise mechanically fastened in place so as to compartmentalize trailers and truck bodies for multi-temperature food distribution. The panels are used to divide the trailer or body both longitudinally, along the long axis of the trailer, and laterally, across the width of the trailer. Some partition systems include panels that can be readily removed and placed along the sidewall of the trailer when not in use.

Insulated bulkheads are panels that extend across the width of a trailer to form separate fore and aft cargo areas. Like partitions, insulated bulkheads allow a refrigerated hauler to carry two or more loads at different temperatures within the same trailer or cargo container. For instance, bulkheads may be used to separate fresh food products from frozen or dry goods. Bulkheads are optionally equipped with walk-through doors similar to those used in partitions to permit ingress to and egress from each conditioned cargo area. Due to the functional similarities between bulkheads and panels, the latter are sometimes referred to as bulkheads.

SUMMARY

Partition systems can include at least two panels are independently attached to one or more mounting assemblies such that each panel can be moved independently. In a preferred embodiment, two bulkheads or panels are slideably attached to separate pairs of ceiling-mounted rails in a refrigerated trailer such that each bulkhead or panel can be independently slid toward the front of a trailer or toward the rear of a trailer to define, in cooperation with a removable center partition wall, a plurality of different cargo areas to be maintained at different temperatures. In another preferred embodiment, two panels in the form of half-width bulkheads are releaseably secured to one another and independently, slideably attached to ceiling of the trailer such that each half-width bulkhead can be independently raised and lowered with a minimum of fore and aft clearance.

Certain embodiments further include an apparatus for lifting or moving a partition or panel. In one embodiment, a lift device may include a frame that is mountable to an interior surface of a cargo area and a locking mechanism comprised of smooth and knurled guide and locking pins through which a strap is fed. In preferred embodiments at least one locking pin can slide between a locking position which inhibits strap movement and a non-locking position in which the strap is substantially free to slide through the lift mechanism. In one embodiment, a knurled locking pin may be operable to slide into a locking position when a load is placed on a lifting end of the strap, such as when the strap is connected to a panel which is being lifted or moved. In another aspect, the knurled guide pin may be operable to slide to a non-locking position when a user pulls on the opposite end of the strap.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
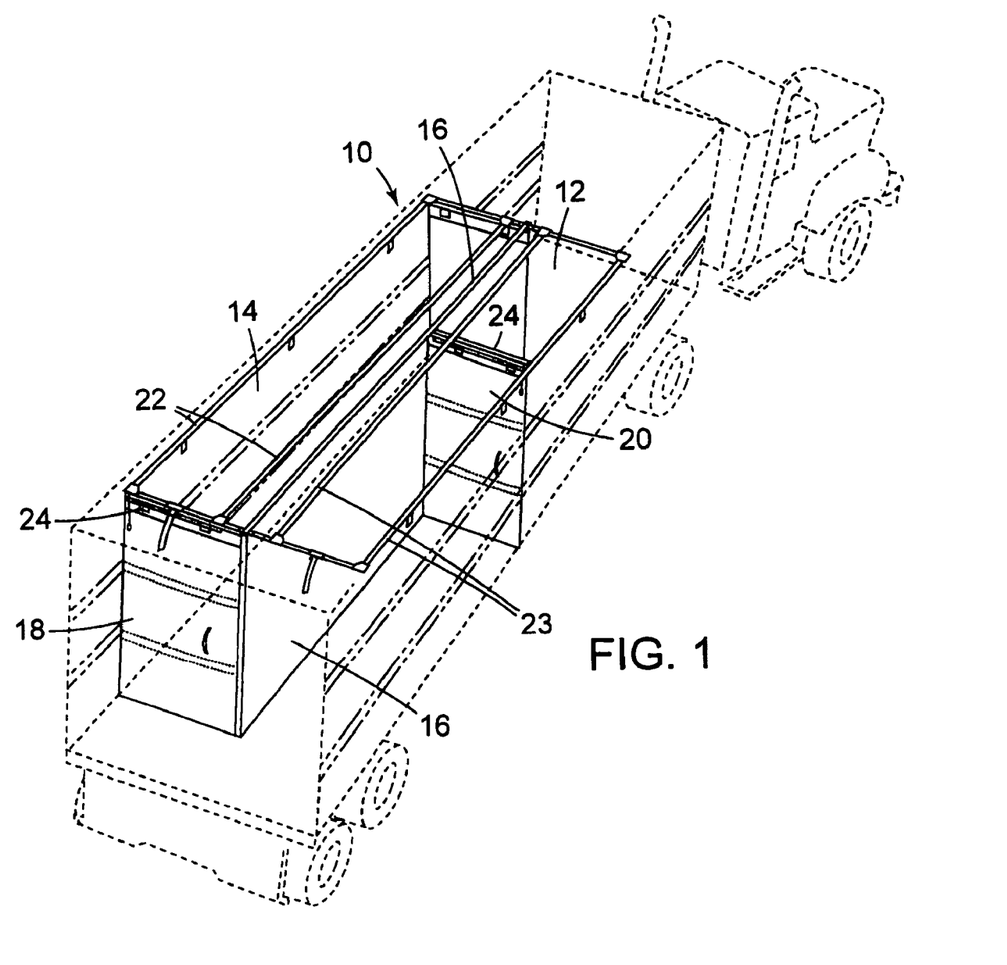
FIG. 1 is a perspective view of a trailer containing center partition panels extending along the long axis of the trailer, two horizontal panels, and a rail and trolley system for moving the horizontal panel in the axial direction.

Referring to FIG. 1, the trailer 10 encloses a cargo space. The cargo space is separated into a plurality of zones or areas 12, 14 that can optionally be maintained at different temperatures. Center partition panels 16 extend along the long axis of the trailer and separate the trailer into a left zone 12 and a right zone 14. The partition panels 16 can have various interfitting modular constructions, as is known in the art. Lateral panels 18, 20 extend laterally from the center partitions 16 to the left and right trailer walls. The right panel 20 is mounted forward of the left panel 18, thereby decreasing the volume of the right zone 14 relative to the left zone 12. Accordingly, the volume of air in the right zone 14 that must be temperature controlled is minimized, which in turn maximizes efficiency and reduces strain on the temperature control system.

Figure 4:
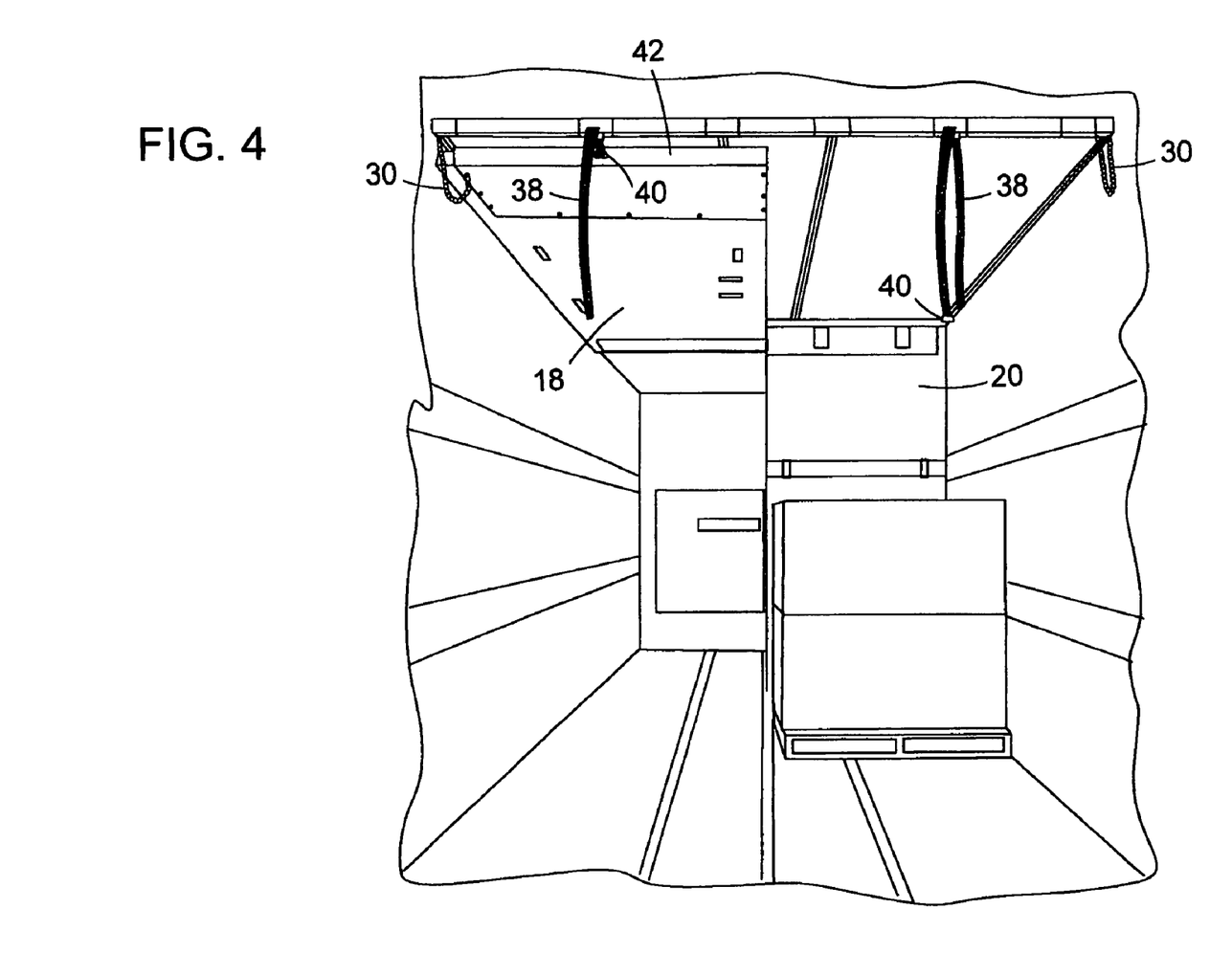
FIG. 4 is a perspective view of the rail systems, trolley assembly, and panel after the panel has been raised into a stowed position by a lift mechanism.

The panels 18, 20 are slideably attached to the rails 22 with a trolley assembly 24. The panels are hingedly attached to trolley assembly 24, and the trolley assemblies are slideably attached to the rails 22, 23. The trolley assemblies permit the panels 18, 20 to be moved in the fore and aft direction and to be "raised" like garage doors and secured to the ceiling when not in use, as shown in FIG. 4 and described in more detail below.

Those skilled in the art will appreciate that the panel, trolley assembly, and rail system can be implemented in a wide variety of configurations. For instance, the rails may be advantageously installed on the side walls of the trailer, thereby enabling the panels 18, 20 to open like a standard household door. The mounting assembly is preferably a trolley assembly, but may optionally be replaced with any mechanism that permits rotational, slideable, or hinged movement between the rails and the bulkhead. It is not necessary that the trolley or other mounting assembly permit continuous slideable movement of the bulkhead relative to the rails. Similarly, the rails may be replaced with other receiving members that cooperate with the selected mounting means. It is not necessary that the receiving means be unitary, continuous, or disposed along the long axis of the trailer. For instance, the receiving means can be a series of individual receptacles disposed along the ceiling of the trailer.

Figure 2:
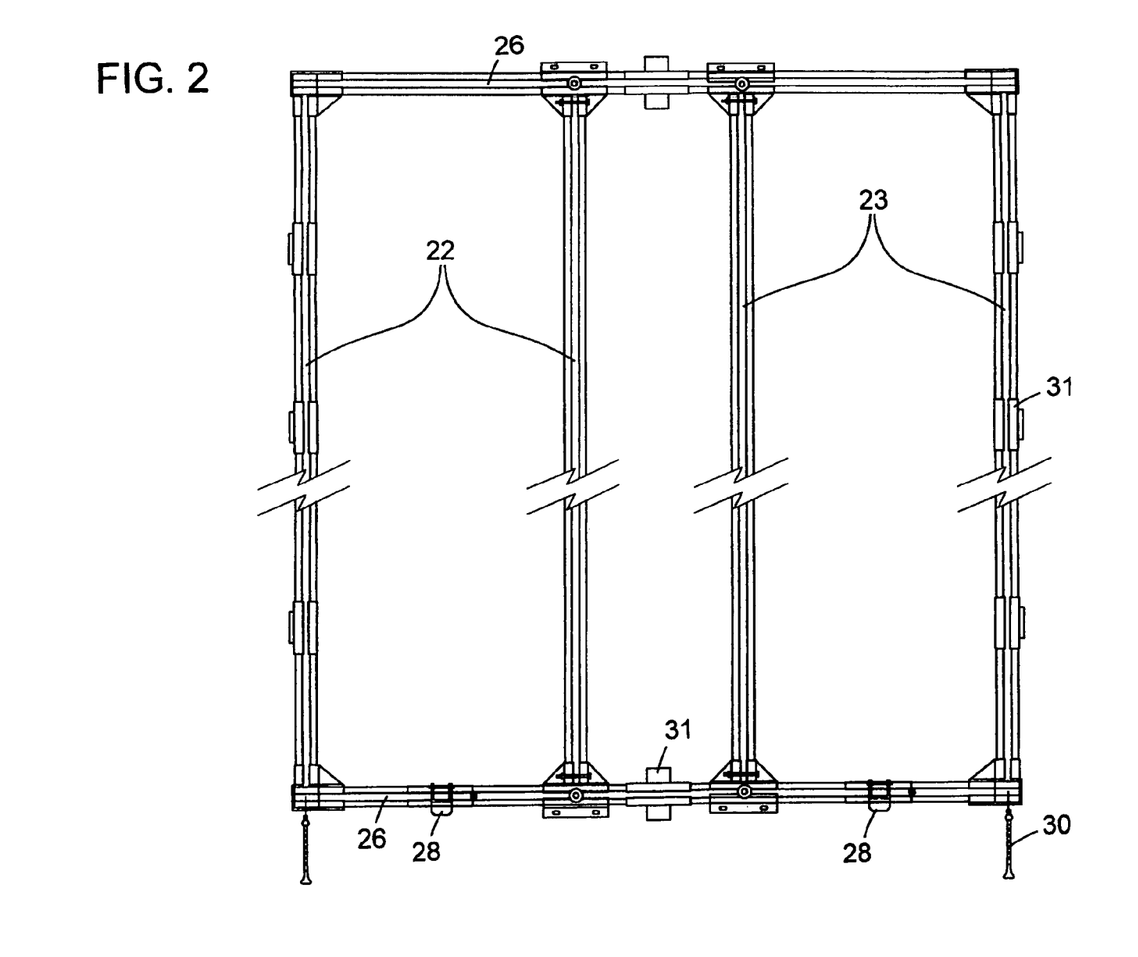
FIG. 2 is a plan view of rail system shown in FIG. 1.

FIG. 2 is a plan view of the rail assembly shown in FIG. 1. In the depicted embodiment, the receiving members comprise longitudinal rails 22, 23 having an internal channel adapted to receive a slideable member, preferably a roller. End rails 26 provide a mount for the ends of the longitudinal rails 22, 23 and also function as a trolley stop. Fixed to the end rails 26 are lift mechanisms 28 and safety chains 30, the functionality of which is described below. Mounting flanges 31 permit the rails to be fastened to the trailer walls or ceiling with standard fasteners.

Here again, various modifications can be readily made without departing from the invention. For instance, end rails 26 can be replaced with end caps or can be omitted entirely. The end rails 26 can also be advantageously replaced with half-width movable rails that span and slideably engage the two longitudinal rails on the left 22 and the two longitudinal rails on the right 23, respectively. Each moveable rail can be fitted with lift mechanisms 28 and safety chains 30 such that each moveable rail can be slid into position relative to each panel before each is lifted into an inoperative or stowed position. Additional longitudinal rails 22, 23 can be added to accommodate additional panels or panels of different widths.

Figure 3:
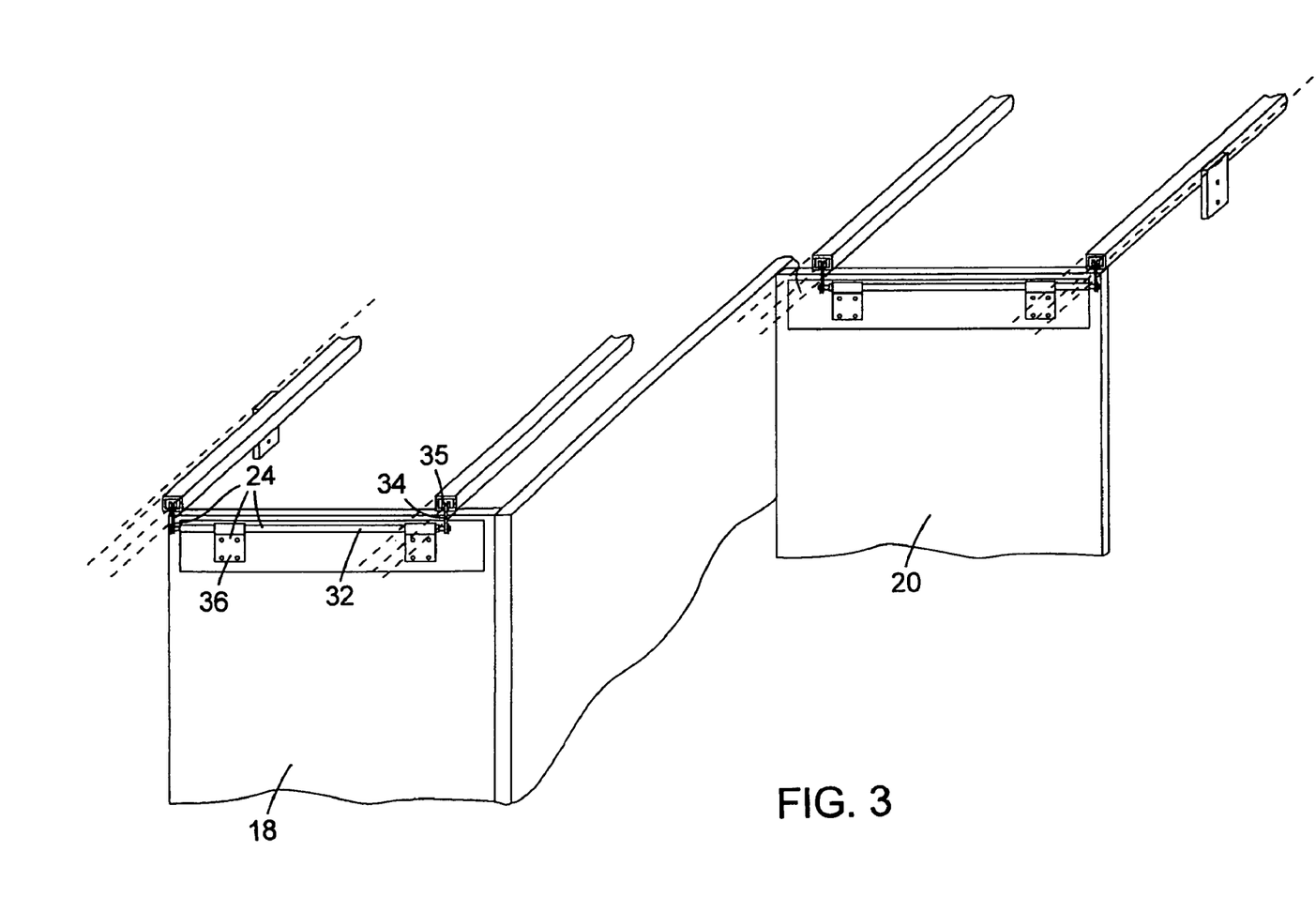
FIG. 3 is a perspective view of a rail system, trolley assembly slideably attached to the rail system, and a panel hingedly attached to the rail system.

FIG. 3 is a perspective view of the panels 18, 20, the trolley assembly 24, and the rails 22, 23. The trolley assembly consists of hinge plates 36 that are fixedly secured to the panels 18, 20, a hinge rod 32, and trolleys 34. The trolleys 34 serve to suspend the panel from the rails 22. Trolleys 34 include rollers 35 which permit the bulkhead to be slid into a desired longitudinal position, as shown in FIG. 1. The hinge mechanism 32, 36 permits the panel to rotate about the hinge rod 32, as shown in FIG. 4.

The panel is moved from the position shown in FIG. 3 to the position shown in FIG. 4 by lifting the bottom of the panel 18 up and to the rear of the trailer. The panel 18 is moved fore or aft, as needed, to position the base of the panel 18 proximate to the strap 38 having a hook 40. The hook 40 is secured to the base 42 of panel 18, preferably by attachment to a cooperating receptacle. The strap 38 is pulled downward to raise the base 42 of the panel to the ceiling of the trailer. The chains 30 can be attached to the base 18 of the panel to safeguard against unintended release of the panel 18 from the stowed position.

Referring to FIGS. 3 and 4, the assemblies may be advantageously modified to provide additional or different functionalities. The trolley assembly 32, 34, 36 can optionally be replaced with any known mounting mechanism that cooperates with the rails. The mounting means may comprise a post or flange integrally molded into the panel 18 and adapted to be received into the rails 22. As further examples, the mounting means may include i) a flat slideable member that engages an interior surface of the rail member and is hingedly attached to the bulkhead, ii) an integral, one piece, arcuate tab attached to the top of the bulkhead that can be inserted into one of a plurality of longitudinally arranged receiving means at a predetermined angle such that the tab locks the bulkhead into place as the bulkhead is lowered into a vertical position, iii) a hinge member that releaseably locks into one of a plurality of longitudinally disposed receiving means, or iv) any other known mounting mechanism suitable for such mechanical attachment. Likewise, rails 22, 23 can be replaced with other mechanisms that cooperate with the selected mounting mechanism. For example, the rails 22, 23 may be replaced with a continuous rail having a plurality of axially disposed apertures for receiving cooperatively configured mounting means or a series of independently mounted receiving members for receiving cooperatively configured mounting means. As noted above, the rail members can optionally be mounted on a vertical surface, such as a trailer wall. Mounting members can thus be selected to enable the bulkheads to swing open like a door, slide in the axial direction in which the rail members are mounted, or be readily removed and reinstalled in another set of receiving members. The foregoing modifications are illustrative only and are not intended to comprise a comprehensive list of all modifications that can be made to the instant apparatus without departing from the invention.

Figure 5:
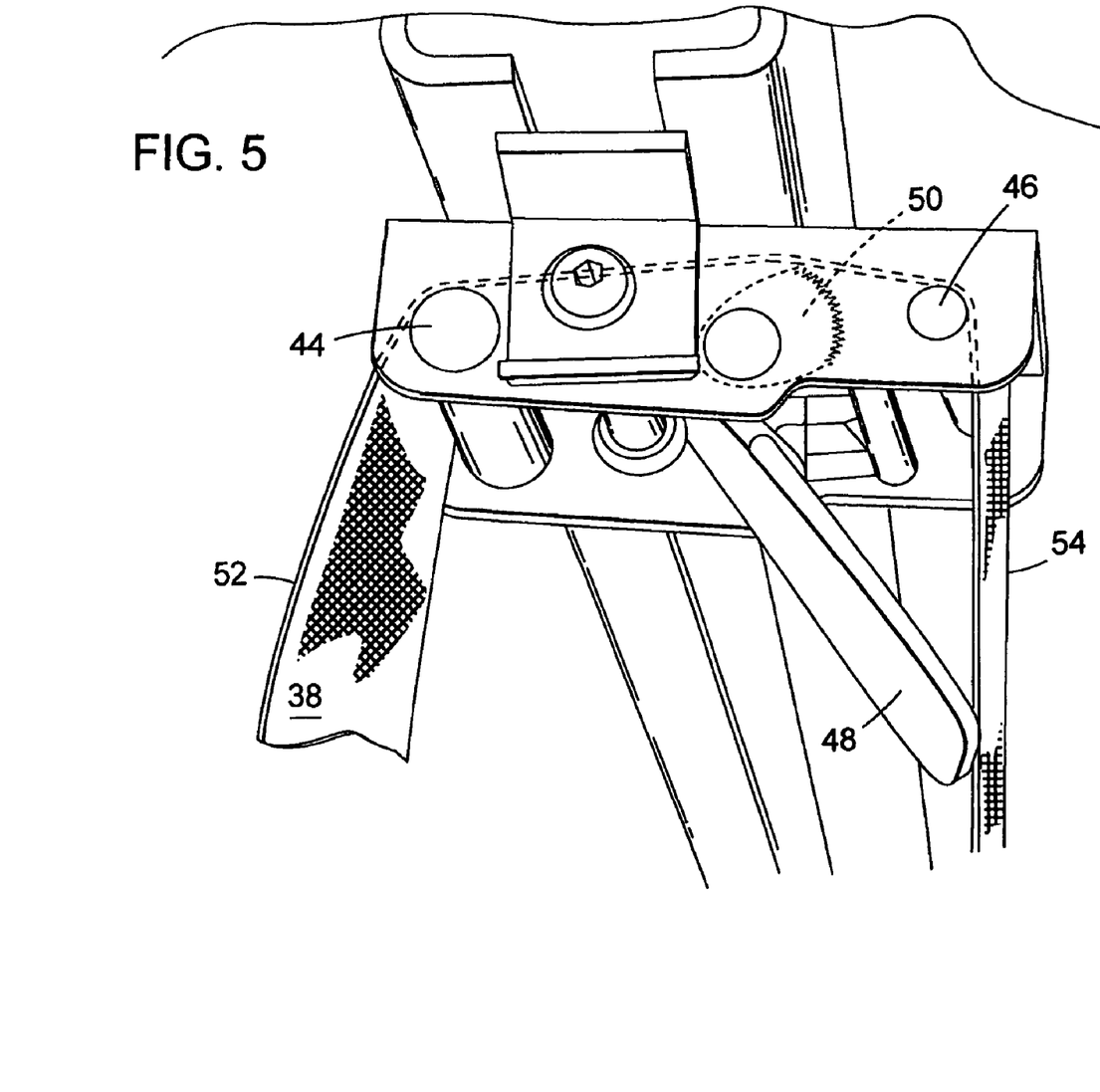
FIG. 5 is a perspective view of a lift mechanism.

FIG. 5 is a detailed view of the strap 38 and cooperating locking mechanism shown in FIG. 4. The strap 38 is positioned over guide pins 44, 46. Flange 48 is rigidly attached to cam 50. In use, the left portion 52 of the strap 38 is attached to the base 42 of the panel 18 either directly or through a suitable cooperating attachment means such as a hook and a mateable receptacle. The right portion 54 of the strap 38 is pulled downward until the panel 18 is in the desired stowage position. Then the flange 48 is forced upward by action of a spring (not shown), thereby forcing cam 50 against strap 38 and locking the strap in place. To lower the bulkhead 18, the right portion 54 of the strap 38 is pulled downward, which in turn forces flange 48 downward to the depicted, open position. The strap is then free to travel over guide pins 44, 46 as long as the right portion of the strap is maintained in the depicted, vertical position in substantial tension, which holds flange 48 in the open position. When the end of the strap portion 54 is raised upwards and to the rear of the trailer, spring force causes the flange and cam assembly to rotate counterclockwise, causing the cam 50 to lock the strap 50 in place. Accordingly, the base 42 of the bulkhead 18 is lowered toward the floor of the trailer by holding the strap portion 54 in a vertical position as the strap is pulled over pins 44, 46 by the weight of the bulkhead.

Figure 6:
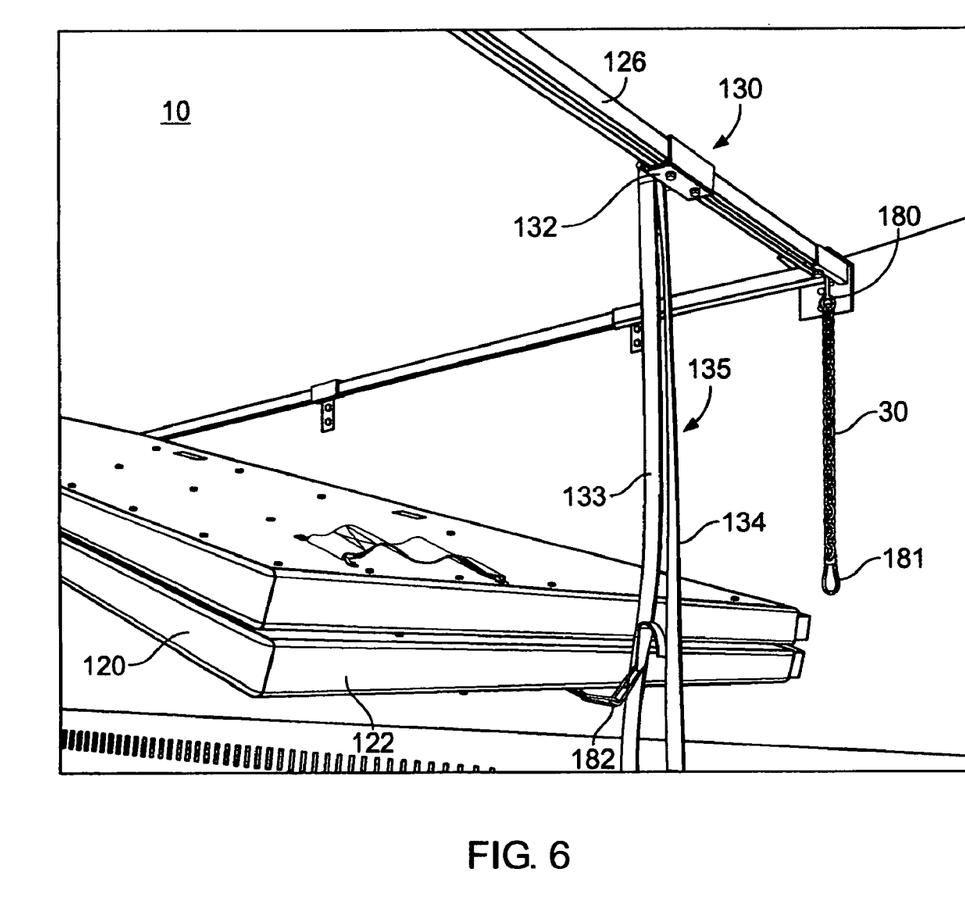
FIG. 6 is a perspective view of a panel and a lift mechanism mounted to the interior of a cargo trailer in accordance with another embodiment of the invention.

FIG. 6 shows an alternate lift mechanism for use in the cargo trailer 10 or other cargo transport devices. Movable panel 120 is mounted to the interior of the trailer 10 using a trolley assembly (not shown) or other mounting mechanism such that the panel 120 may be moved between an operational position (refer to position of panel 18 in FIG. 3) and a stowed position (refer to position of panel 18 in FIG. 4). As shown in FIG. 6, a lift device 130 may also be used to suspend the moveable panel 120 in a position between the operational and stowed positions. The device 130 includes a frame 132 that is adjustably mounted to end rail 26. As such, the lateral position of the device 130 may be adjusted by sliding the device 130 along the end rail 26. In addition, the lifting device 130 includes a strap 135 having a first end 133 adapted to be attached to the panel 122 and a second end 134 adapted to be manipulated by an operator. The first end 133 of the strap 135 is configured to attach to the base 122 of the moveable panel 120, and the strap 135 is fed through the lifting device frame 132.

In operation, a user pulls on the second end 134 of the strap 135 while the first end 133 is connected to the panel 120. Tension on the second end 134 of the strap 135 is translated into a lifting force on the base 122 of the panel 120. The base 122 of the panel 120 may be swung toward the ceiling of the trailer 10 until the panel 120 is positioned in the space near the ceiling. The panel 120 may be retained in the stowed position by a movable locking pin (not shown in FIG. 6, described in more detail below) in the lifting device 130 that acts to prevent the strap 135 from traveling through the frame 132.

Optionally, one or more safety chains 30 may be connected to the panel 120 to protect against the accidental release of the panel 120 from the stowed position. The upper end of chain 30 is fitted with an adaptor 180 which is slideably received in an interior channel of end rail 26. Chain 30 can be moved laterally toward the center of panel 120 such that hook 181 is laterally proximate to eye 182. In such a position, the hook 181 may be fastened to eye 182 so that chain 30 will support panel 120 in an elevated position in the event of a mechanical failure of lift mechanism 132 or strap 135.

Figure 7:
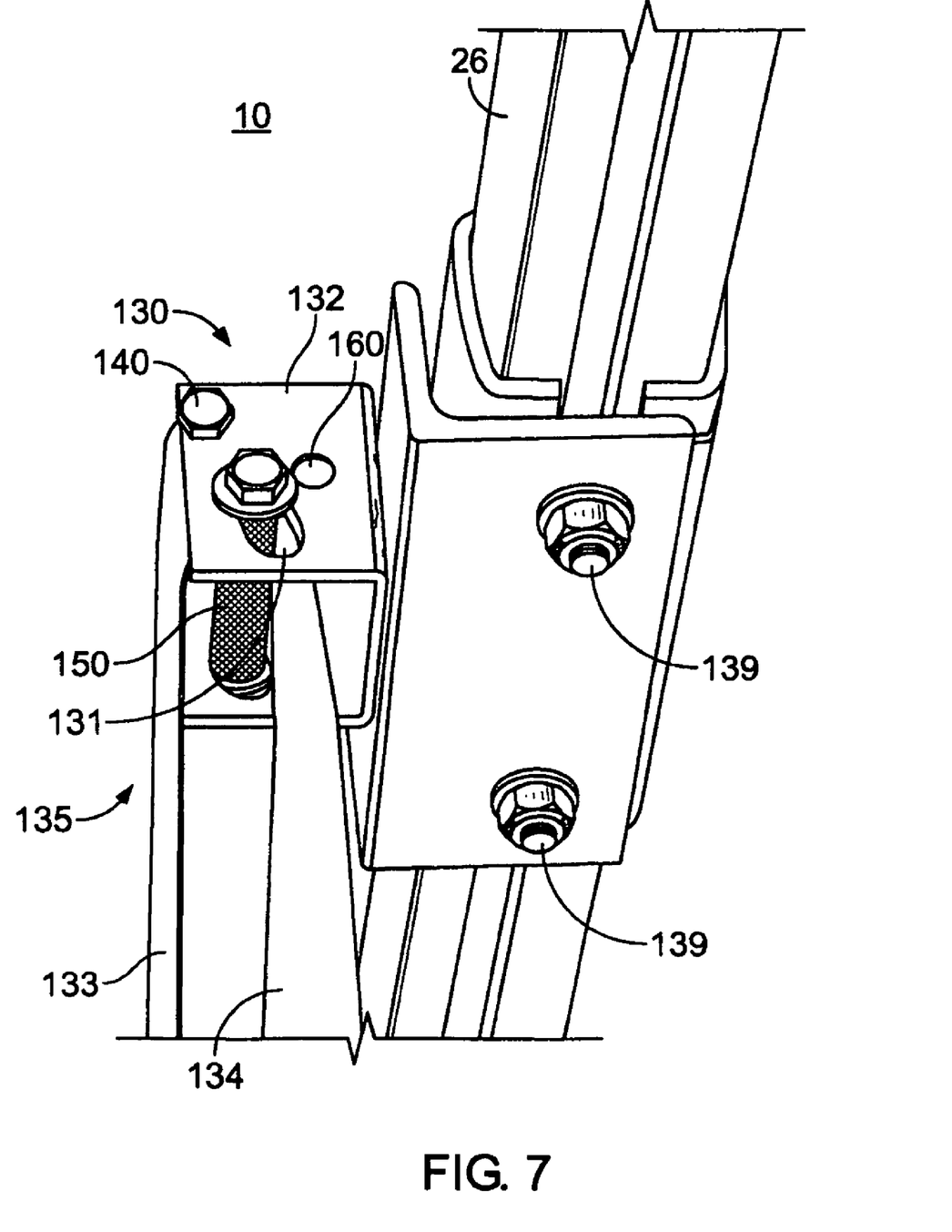
FIG. 7 is a perspective view of the lift mechanism of FIG. 6.

FIG. 7 shows the lift device 130 in more detail. Frame 132 is slideably engaged with the end rail 26, and after the frame 132 is appropriately positioned along the end rail 26, retaining bolts 139 may be tightened to retain the frame 132 in a fixed position. The strap 135 is positioned around a guide pin 140 over which the strap 135 slides. A movable locking guide pin 150 is moveably mounted to the frame 132, and preferably, the pin 150 is mounted in a locking pin pathway 131. The pin 150 may be mounted in the pathway 131 and proximate to the travel path of the strap 135. Longitudinal movement of the strap 135 may cause the movable locking pin 150 to slide between a locking position (depicted in FIG. 7) and a non-locking position (described in more detail below), depending upon the orientation of strap 135 during such longitudinal movement. The movable locking pin 150 is in the locking position near the upper end of the pathway 131. When the movable locking pin 150 engages the strap 135 and moves into the locking position, the strap 135 is compressed between the movable locking pin 150 and a knurled fixed locking pin 160 such that the longitudinal motion of the strap 135 is inhibited or substantially prevented. In preferred embodiments, the movable locking pin 150 and fixed locking pin 160 cooperate to hold strap 135 and prevent the strap from moving across guide pin 140, thereby holding the panel 120 in a substantially vertically fixed position.

Figure 8:
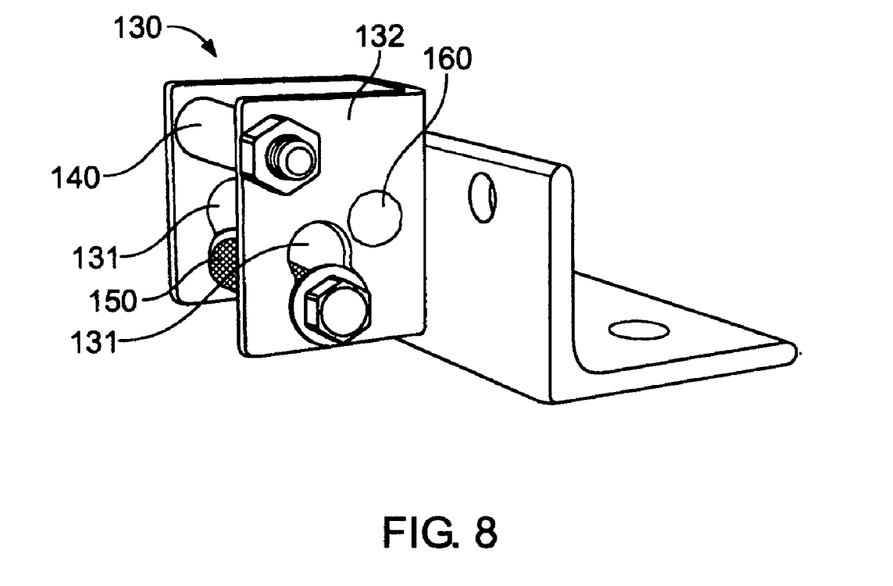
FIG. 8 is a perspective view of the lift mechanism of FIG. 6 with a strap removed from the view.
Figure 9:
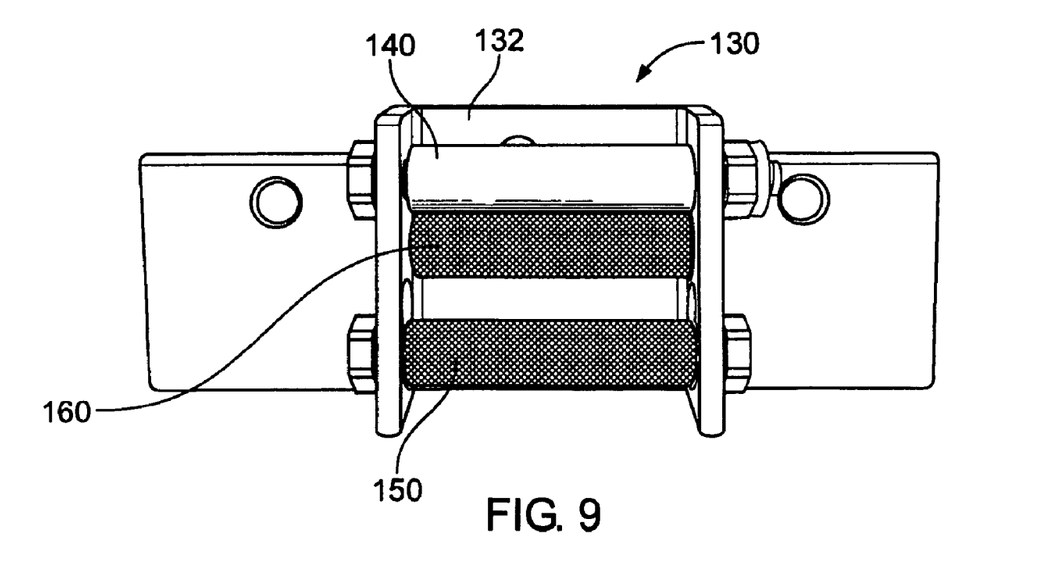
FIG. 9 is a front view of the lift mechanism from FIG. 8.

FIGS. 8 and 9 are close-up views of the lock mechanism 130. Movable locking pin 150 is disposed in a non-locking position near the lower end of the pathway 131. The fixed locking pin 160, the movable locking pin 150, and the pivot guide pin 140 are substantially cylindrical, and the pins 140, 150, and 160 are mounted in the frame 132 such that the guide pins are substantially parallel to one another. Optionally, the pivot guide pin 140 may have a substantially smooth circumferential surface to minimize friction as the strap 135 travels over the guide pin 140. As a further option, the guide pin 140 may have a rotatable sleeve or roller mounted thereon to facilitate translational movement of the strap 135. As discussed above, the moveable locking pin 150 and the fixed locking pin 160 may have knurled or otherwise coarse circumferential surface (e.g., greater surface roughness than the pivot guide pin 140) to prevent the strap 135 from slipping between the guide pins 150 and 160 while the strap is compressed between the guide pins 150 and 160.

Figure 10A:
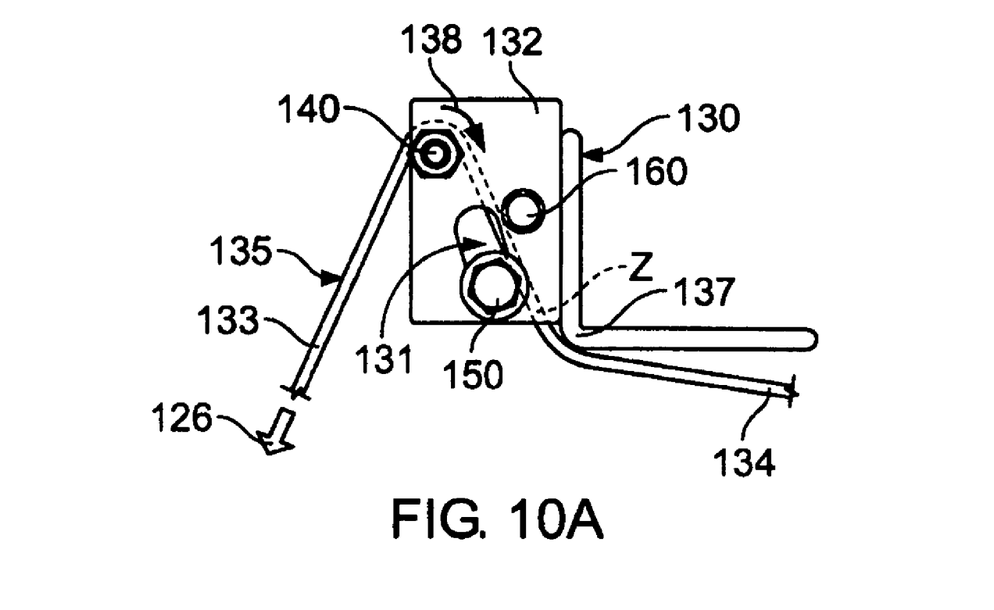
FIGS. 10A-B are side views of the lift mechanism from FIG. 6, in accordance with one embodiment of the invention.
Figure 10B:
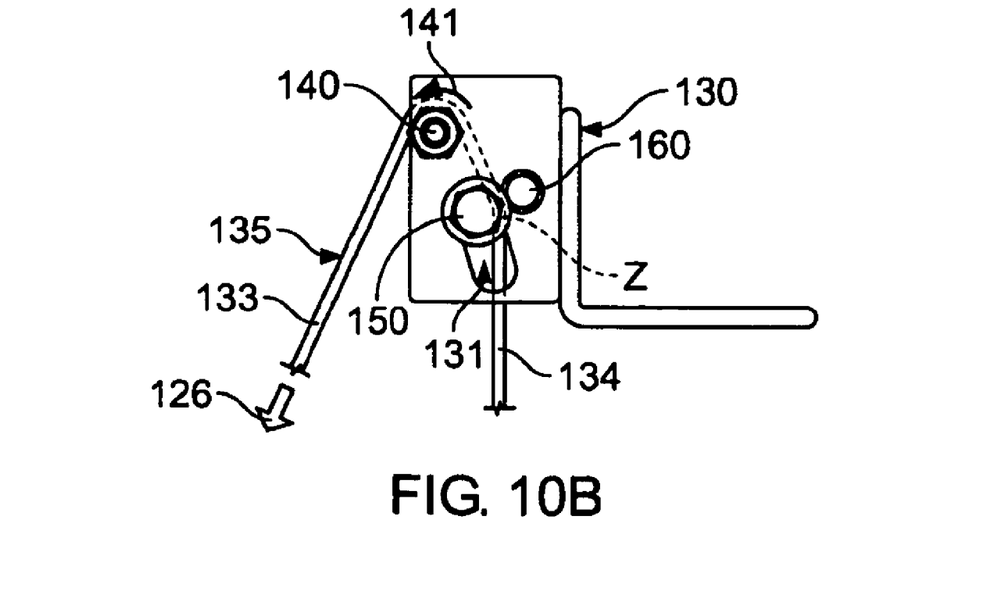

FIGS. 10A-B illustrate the operation of the lift device 130 in further detail. Referring to FIG. 10A, a load 126 is applied to the first end 133 of the strap 135. The load 126 may be the weight of movable panel that is elevated from the floor of the cargo trailer 10 (as shown in FIG. 6) as, for example, when the panel is retained in the stowed position in the space near the ceiling of the cargo trailer. An operator may pull on the second end 134 of the strap 135 so that the strap slides in the direction indicated by arrow 138. Preferably, the second end 134 of the strap is held in an elevated position (as depicted in FIG. 10A) during this operation. The initial movement of the strap in the prescribed direction causes moving locking pin 150 to drop to the bottom of its channel, thereby unlocking or releasing strap 135.

Thereafter the panel 120 can be raised or lowered by pulling the strap 135 toward the operator or permitting the weight of the panel 122 to pull the strap in the opposite direction. So long as the moveable guide pin 150 is not engaged by the strap 135, the guide pin 150 is maintained in the non-locking position and the strap is not compressed between the moveable guide pin 150 and the fixed locking pin 160. As such, the load 126 causes the strap 135 to travel over the pivot pin 140 in a travel direction 138 toward the load 126. If, for example, the first end 133 of the strap 135 was connected to a movable panel 120 that was in the stowed position, the user could lower the panel in a controlled manner by manipulating the operational end 134 of the strap 135 so that it slides against the rounded corner 137 of the frame 132 and does not engage the moveable guide pin 150.

An operator may stop the strap 135 from traveling over the pivot guide pin 140 at any time (e.g., cease the lowering of the panel 120 so that the panel 120 is not fully lowered to its operational position) by allowing the strap 135 to engage the moveable guide pin 150 as the strap moves in the direction indicated by arrow 141. To execute this locking operation, an operator may lower the second end 134 to a substantially vertical position, as shown in FIG. 10B, as the strap is allowed to travel in direction 141. The friction between the strap 135 and the coarse surface of movable guide pin 150 causes the moveable guide pin 150 to slide upwards in the pathway 131 to the locking position. When the moveable guide pin 150 moves to the locking position 150, the strap 135 is compressed between the moveable guide pin 150 and the fixed locking pin 160 so that further movement of the strap 135 over the pivot guide pin 140 is substantially prevented. The panel 120 is thereby suspended in place.

By using the aforementioned techniques to lock and unlock the lift mechanism 130, an operator may safely lift or lower a moveable panel 120 or other heavy load in small but controlled increments. Such incremental lifting operations can advantageously reduce physical strain and improve safety and ergonomics. For instance, an operator can stand substantially stationary and upright while incrementally lifting the panel substantially completely through arm movement alone, without the need to reposition himself or significantly exert abdominal or spinal muscles.

The lift mechanism 130 described above is merely an exemplary embodiment. The frame structure can be freely modified so as to accommodate the selected locking mechanism. The lift element may be a strap, chain, cord, rope, or other member adapted to exert tensile or compressive force on a panel. Where a chain or rope is used, the locking mechanism may include locking members with sprockets or pulleys adapted to releaseably and fixedly engage the lift element.

A system of separate lift mechanisms can be used to guide the strap or other lift element, and one or more of them may include a locking mechanism. For instance, a strap may be fed through multiple frame members which guide the strap through the desired path. Preferably, the frame member proximate the operator includes a locking mechanism.

The lift mechanism(s) can be disposed at any desired location, and the lift mechanisms can be adapted to move in a longitudinal and/or lateral direction. For instance, the lift mechanism can be advantageously disposed on rail which is affixed to, and slides longitudinally with, the trolley member. Such a configuration permits the panels to be raised on lowered via the lift mechanism wherever they are located along the length of the cargo area.

The lift mechanism can be advantageously implemented to raise any item to which the lift member (e.g. a strap) has been adapted to attach. Any suitable adaptor or fastening element may be affixed to the end of the strap so as to secure and raise the item. In applications involving heavy items, pulley or gear systems can be incorporated into the lift mechanism so as to provide mechanical leverage.

The particular locking pin and guide pin arrangement discussed above is also merely illustrative. One or both of the locking pins may be operable to translate or slide in and out of a locked condition. Other suitable rigid members may be substituted for the moving and/or stationary locking pins. For instance, in strap applications, a pin, roller or wheel may cooperate with a stationary rigid member such as a plate (either smooth or coarse) to effectuate the locking operation.

Preferably, the movable locking mechanism will be releaseable and engageable through manipulation of the strap alone.

It is also preferred that the locking mechanism be constructed such that the strap is always positioned between the moving locking pin and stationary locking pin. That arrangement provides the significant advantage that the device may automatically lock and prevent the panel from falling in the event that an operator accidentally releases the strap.

The panels 18 and 20 may be advantageously used without center partition panels 16. For instance, the two panels may be placed side by side and fastened together to make a full-width horizontal bulkhead. A user can advantageously separate the panels, or half-width bulkheads, from one another prior to raising the panels in the manner described above. Further, because each panel is independently and slideably mounted, the amount of rearward clearance needed to raise the panel is reduced significantly. The top of the panel can be slid forward as the bottom is raised rearwardly, which permits the panel to be lifted and stowed even when pallets and cargo are stacked close to the panel.

The panels of the instant invention may be secured relative to one another with a variety of known means. For instance, the panels can be equipped with cooperating straps and buckles. The panels can alternately be equipped with cooperating channels, grooves, flanges, polymeric seals, or locking pins.

A number of embodiments of the invention have been described. Nevertheless, it will be understood that various modifications may be made without departing from the spirit and scope of the invention. Accordingly, other embodiments are within the scope of the following claims.

What is claimed is:

1. An apparatus for lifting a panel in a cargo area, comprising, a frame member adapted to be rigidly attached relative to an interior surface of the cargo area;
    a guide member rigidly attached to said frame member and adapted to receive a tensile lifting member selected from the group consisting of a strap, chain, cord, or rope, said tensile lifting member having a first end adapted to be secured to a panel member to be raised into an elevated position and a second end adapted to be manually manipulated by an operator; and
    a lock mechanism having a mobile locking member which translates between a locked position in which the mobile locking member cooperates with an opposing locking member to inhibit movement of the tensile lifting member and an unlocked position in which the tensile lifting member is permitted to pass between said mobile locking member and said opposing locking member substantially uninhibited by said locking members, the mobile locking member being movable from the locked position to the unlocked position by manual manipulation of the second end of the tensile lifting member away from the first end.

2. The apparatus of claim 1, wherein the guide member includes a pin, sleeve, or roller mounted to the frame member and having a substantially smooth circumferential surface.

3. The apparatus of claim 1, wherein the mobile locking member comprises a movable locking pin mounted to the frame member such that the locking pin is substantially parallel to the guide member.

4. The apparatus of claim 2, wherein the opposing locking member comprises a stationary locking pin having a generally coarse surface.

5. The apparatus of claim 4, wherein the tensile lifting member is a strap.

6. The device of claim 5, wherein the mobile locking member is operable to transition to the unlocked position when the second end of the strap is pulled.

7. The apparatus of claim 1, wherein the mobile locking member is adapted to shift to the locked position when a force is applied to the first end of the tensile lifting member.

8. The apparatus of claim 7, wherein the mobile locking member is adapted to shift to the unlocked position when a force is applied to the second end of the tensile lifting member.

9. The apparatus of claim 1, wherein the panel member is operable to be raised and lowered via the tensile lifting member when the tensile lifting member is secured to the panel member and when the mobile locking member is in an unlocked condition.

10. The apparatus of claim 1, wherein the lock mechanism is operable to automatically lock when a force is applied to the first end of the tensile lifting member and substantially no force is applied to the second end of the tensile lifting member.

11. An apparatus for adjusting a panel to an operational position or to a stowed position in a cargo area, the apparatus comprising:
a frame member mountable in the cargo area;
a guide member to receive a flexible member having a first end connectable to the panel, the guide member being attached to the frame member; and
a lock mechanism having a movable locking member which translates between a locked position and an unlocked position, the movable locking member being adjustable to the locked position from the unlocked position by manual manipulation of a second end of the flexible member toward the first end.

12. The apparatus of claim 11, wherein the flexible member comprises a strap, chain, cord, or rope.

13. The apparatus of claim 11, wherein when the flexible member is received by the guide member and when the movable locking member is in the locked position, the movable locking member cooperates with an opposing locking member to inhibit movement of the flexible member relative to the lock mechanism.

14. The apparatus of claim 13, wherein when the flexible lifting member is received by the guide member and when the movable locking member is in the unlocked position, the flexible lifting member is permitted to move relative to the lock mechanism.

15. The apparatus of claim 11, wherein the guide member includes a pin, sleeve, or roller mounted to the frame member and having a substantially smooth circumferential surface.

16. The apparatus of claim 11, wherein the movable locking member comprises an adjustable pin engaged with the frame member such that the adjustable pin is substantially parallel to the guide member.

17. The apparatus of claim 16, wherein the lock mechanism further comprises an opposing locking member that cooperates with the movable locking member, the opposing locking member including a stationary locking pin having a generally coarse surface.

18. The apparatus of claim 11, wherein the movable locking member adjusts to the locked position when the flexible member is received by the guide member and a force is applied to the first end of the flexible member.

19. The apparatus of claim 18, wherein the movable locking member adjusts to the unlocked position when a force is applied to the second end of the flexible member.

20. The apparatus of claim 11, wherein the lock mechanism automatically locks when the flexible member is received by the guide member and a force is applied to the first end of the flexible member while substantially no force is applied to the second end of the flexible member.

21. An apparatus for adjusting a panel to an operational position or to a stowed position in a cargo area, the apparatus comprising:
a frame member mountable in the cargo area;
a guide member to receive a flexible member having a first end connectable to the panel, the guide member being attached to the frame member; and
a lock mechanism having a movable locking member which translates between a locked position and an unlocked position, the movable locking member being adjustable between the locked and unlocked positions by manual manipulation of a second end of the flexible member,
wherein the movable locking member comprises an adjustable pin engaged with the frame member such that the adjustable pin is substantially parallel to the guide member, and
wherein the lock mechanism further comprises an opposing locking member that cooperates with the movable locking member, the opposing locking member including a stationary locking pin having a generally coarse surface.

22. The apparatus of claim 21, wherein when the flexible member is received by the guide member and when the movable locking member is in the locked position, the movable locking member cooperates with the opposing locking member to inhibit movement of the flexible member relative to the lock mechanism.

23. The apparatus of claim 22, wherein when the flexible lifting member is received by the guide member and when the movable locking member is in the unlocked position, the flexible lifting member is permitted to move relative to the lock mechanism.

24. The apparatus of claim 21, wherein the movable locking member adjusts to the locked position when the flexible member is received by the guide member and a force is applied to the first end of the flexible member.

25. The apparatus of claim 24, wherein the movable locking member adjusts to the unlocked position when a force is applied to the second end of the flexible member.

26. The apparatus of claim 21, wherein the guide member, the movable locking member, and the opposing locking member are all engaged with at least one wall of the frame member.

27. The apparatus of claim 21, wherein the movable locking member moves within a pathway slot formed in the frame member, the pathway slot having a greater width than the movable locking member.

* * * * *